June 12, 1945.  W. JASTRZEBSKI  2,377,886

FLUID OPERATED POWER TRANSMITTER

Filed Sept. 22, 1942   7 Sheets-Sheet 1

Inventor:
Wincenty Jastrzebski
By Haseltine, Lake & Co. Attorneys.

June 12, 1945.  W. JASTRZEBSKI  2,377,886

FLUID OPERATED POWER TRANSMITTER

Filed Sept. 22, 1942  7 Sheets-Sheet 4

Inventor:
Wincenty Jastrzebski
By Haseltine Lake & Co. Attorneys.

June 12, 1945.  W. JASTRZEBSKI  2,377,886
FLUID OPERATED POWER TRANSMITTER
Filed Sept. 22, 1942  7 Sheets-Sheet 7

Inventor:
Wincenty Jastrzebski
By Haseltine, Lake & Co. Attorneys

Patented June 12, 1945

2,377,886

UNITED STATES PATENT OFFICE 2,377,886

FLUID OPERATED POWER TRANSMITTER

Wincenty Jastrzebski, Aix-les-Bains, France; vested in the Alien Property Custodian Application September 22, 1942, Serial No. 459,260
In France December 15, 1941

8 Claims. (Cl. 192—58)

Hydraulic change speed gears are already known wherein the change of gear ratio from a driving shaft to a driven shaft is obtained by increasing or decreasing the quantity of a liquid force by a pump operatively connected to one of said shafts and derived from another pump operatively connected to the other shaft. With such a structure, when it is desired to increase the speed of the driven shaft, a larger quantity of liquid must be displaced from one pump into the other.

It is an object of the present invention to provide as an improvement and development of the aforesaid type of hydraulic change speed gear a novel fluid operated apparatus utilizable as a power transmitter either for imparting to a driven shaft selectively any one of an unlimited number of different speeds from a driving shaft or else as a change speed power transmitter permitting the impulse from a driving shaft to be imparted without any substantial loss of energy to a driven shaft with several different gearing ratios and also a reverse drive to be obtained.

Another object of the invention is to provide a power transmitter utilizable for miscellaneous purposes whenever the speed of a driven mechanical member requires to be varied and having a simple structure ensuring an inexpensive operation because it functions by controlling a member which regulates the circulation of a liquid, such as oil, filling the transmitter chamber capacity, said circulation resulting from the resistance which checks the motion of the driven shaft with respect to the motion to be imparted thereto by the driving shaft, to each reduction of the mass of circulating liquid corresponding an increase of the driven shaft speed, i. e. a decrease of the ratio between the respective speeds of both shafts.

Yet another object of the invention is more specifically to provide an oil operated power transmitter comprising a pair of revoluble co-axial elements movable with respect to each other and so interengaged as to delineate chambers whose total volume is constant while their partial volumes vary when one of said elements is moved with respect to the other responsive to varying resistances, said power transmitter enabling a number of different rates of speed to be imparted to a driven shaft from a driving shaft revolving at uniform speed.

A further object of the invention is to provide a novel fluid operated power transmitter as aforesaid made up of a small number of simple and rugged members affording the entire structure good operating conditions and proper durability.

A still further object of the invention is to provide a novel fluid operated power transmitter as aforesaid having a better kinetic efficiency than similar fluid operated appliances devised heretofore and so constructed as to permit a direct drive transmission without any relative displacement of members and without any liquid (oil) circulation.

With these and such other objects in view as will incidentally appear hereafter, the invention comprises more particularly the novel construction, combination and arrangements of parts that will be now described in detail with reference to the accompanying diagrammatic sheets of drawings exemplifying several embodiments of the same and forming a part of the present disclosure.

Figure 38:
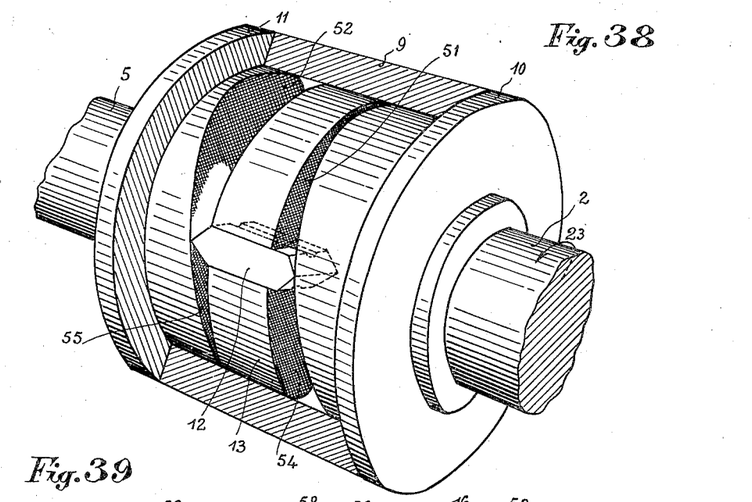
Figure 38 is a diagrammatic isometric view showing an essential part of the power transmitter according to the invention.

As illustrated, the change speed power transmitter is interposed between a shaft 2 (Figs. 1, 2 and 38) which may be and will be termed hereafter a driving shaft and a shaft 5 which may be and will be termed hereafter a driven shaft. Said shaft 5 has a stub extension 7 which projects into a chamber 8 defined in a peripherally cylindrical casing 9 rigid with the driving shaft 2. The end surfaces of said chamber are constituted by a pair of plates 10, 11 forming the end closures of the casing 9. The inner surfaces of the plates 10, 11 have arcuate sinusoidal outlines substantially as shown in Fig. 39 and extend in parallelism.

A surface having such an arcuate outline is generated by a straight line such as ab extending at right angles to the axis of the shaft 2 (Fig. 1) and to which is imparted lengthwise of said axis a sinusoidal motion whose amplitude bears a certain ratio with the extreme degree of unevenness of the plate surface.

Figure 1:
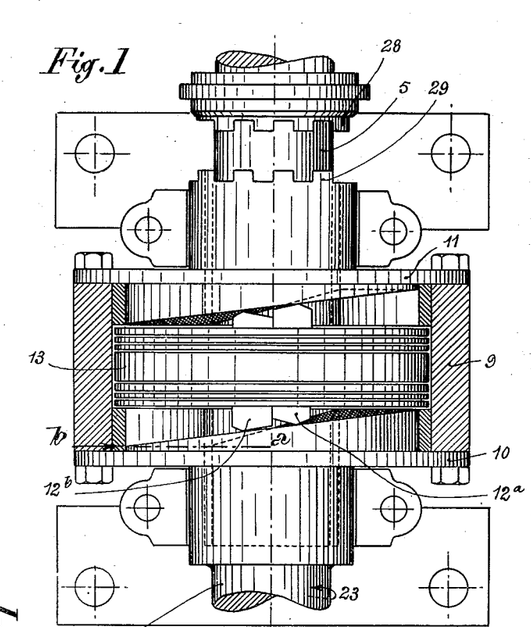
Figure 1 is a plan view of the entire power transmitter, assuming the semi-circular outer wall to have been removed to disclose location of internal members.
Figures 5, 6, 9, 10, 30, 31, 32, 39:
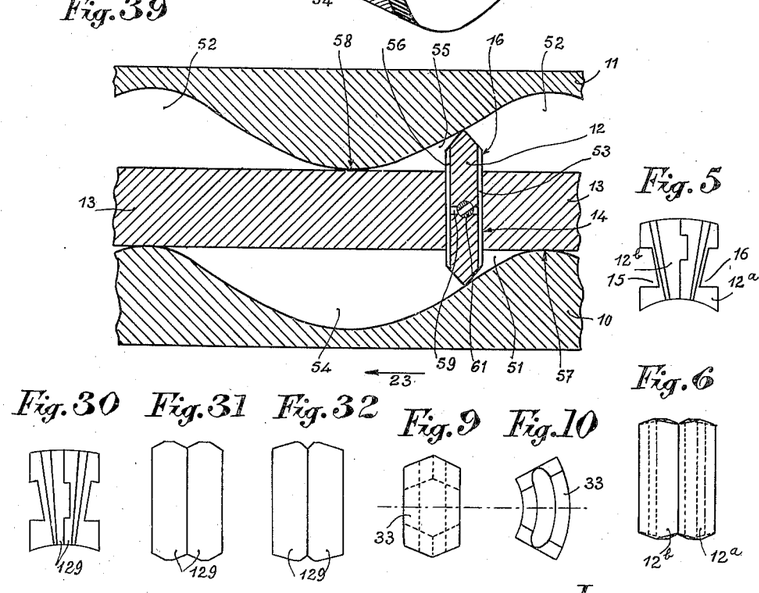
Figures 5 and 6 are respectively an end view and a top plan view of a set of movable partitions.
Figures 9 and 10 are respectively a top plan view and an elevational view of the movable partition embodied in the modified construction shown in Fig. 7.
Figures 30, 31 and 32 are views of the movable partition visible in Fig. 27 taken respectively in end view, in top plan view and in lower plan view.
Figure 39 is an explanatory diagram facilitating proper understanding of the power transmitter operation.

Between the sinusoidally undulated surfaces of the plates 10, 11 is slidably interposed a partition comprising a single element 12 (Fig. 38) parallel to the generatrix ab or a pair of juxtaposed elements 12a, 12b (Figs. 1, 5 and 6). Said partition is adapted alternatively to slide between said undulated plates while providing a fluid-tight seal between them and also between the casing 9 and the driven shaft 5.

The driven shaft 5 carries a circular disk-shaped divider 13 having a thickness equal to the interval (Fig. 39) between planes at right angles to its axis and tangent to the crests or uppermost points of the undulated surfaces of the plates 10, 11. The disk 13 provides fluid tightness along its lines of contact and splits the chamber 8 into a pair of compartments. Said disk 13 has a radial notch 14 in which is snugly received the partition 12 which is freely slidable therein parallel to the axis of the driven shaft 5 and divides in turn each compartment into a pair of sub-compartments.

Communication is provided between both faces 15, 16 of the partition 12 (Fig. 3) by channels 17, 18, 19, 20 in the disk 13. The circulation of the fluid through said channels may be throttled and, if required, fully closed off by operating primary valve means such as a cock 21 which is movably housed in a central recess 22 parallel to the axis of the driven shaft 5 and separates the channels 18, 19 from each other.

The operation of the power transmitter will be clearly understood from Fig. 39. An examination of this diagram shows that the sub-compartments 51, 52 defined on opposite sides of the disk 13 and to the right of the partition 12 communicate through a port 53 formed in the right hand face of said partition while the sub-compartments 54, 55 also defined on opposite sides of the disk 13 but to the left of the partition 12 similarly communicate with each other through a port 56 formed in the left hand face of said partition. The longitudinal ports 53, 56 are interconnected by a transverse port 59 whose sectional area is controlled by secondary valve means such as a cock 61.

Assuming the shaft 2 to rotatably drive the plates 10, 11 in the direction indicated by the arrow 23, it will be understood that the action of their undulated surfaces tends to reduce the volume of the sub-compartments 51, 52 in proportion as their lines of contact 57, 58 with the disk 13 are moved toward the partition 12. This reduction of volume is obviously accompanied by an increase of pressure of the fluid which fills said sub-compartments and which has a tendency to leak out through the ports 53, 59 and 56 into the sub-compartments 54, 55 whose volume gradually increases exactly in terms of the extent of gradual reduction of the volume of the sub-compartments 51, 52.

Assuming all the sub-compartments to be filled with oil or an equivalent liquid, a circulatory motion is imparted to the oil in the direction shown by the arrow 24 (Fig. 3) from the sub-compartments situated on one side of the partition 12 to those situated on the opposite side.

If now by means of the cock 61 (Fig. 39) the port 59 is fully closed, the flow of oil is intercepted therethrough. As a result of this, there is created inside the sub-compartments 51, 52 an oil overpressure which at once reacts against the partition 12 and sets it into motion. This partition is therefore moved and drives with it the disk 13 at a speed equal to that of the plates 10, 11. Should now the port 59 be only partly closed by the cock 61, the oil circulation from the chambers 51, 52 toward the chambers 54, 55 is merely slowed down, this resulting in a rotary sliding motion of the disk 13 with respect to the plates 10, 11.

Figure 2:
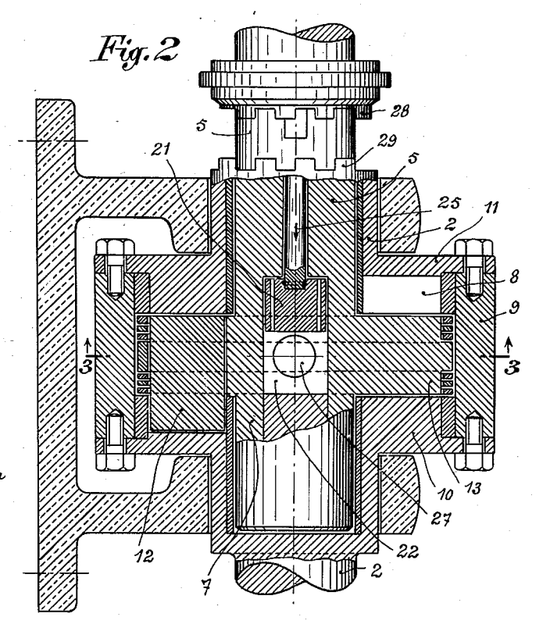
Figure 2 is a sectional view on the line 2—2 of Fig. 3, assuming one of the shafts to have been rotated 180° with respect to the other shaft.
Figures 3, 15, 20A, 20B, 21A, 21B, 22A, 22B, 23A, 23B, 24:
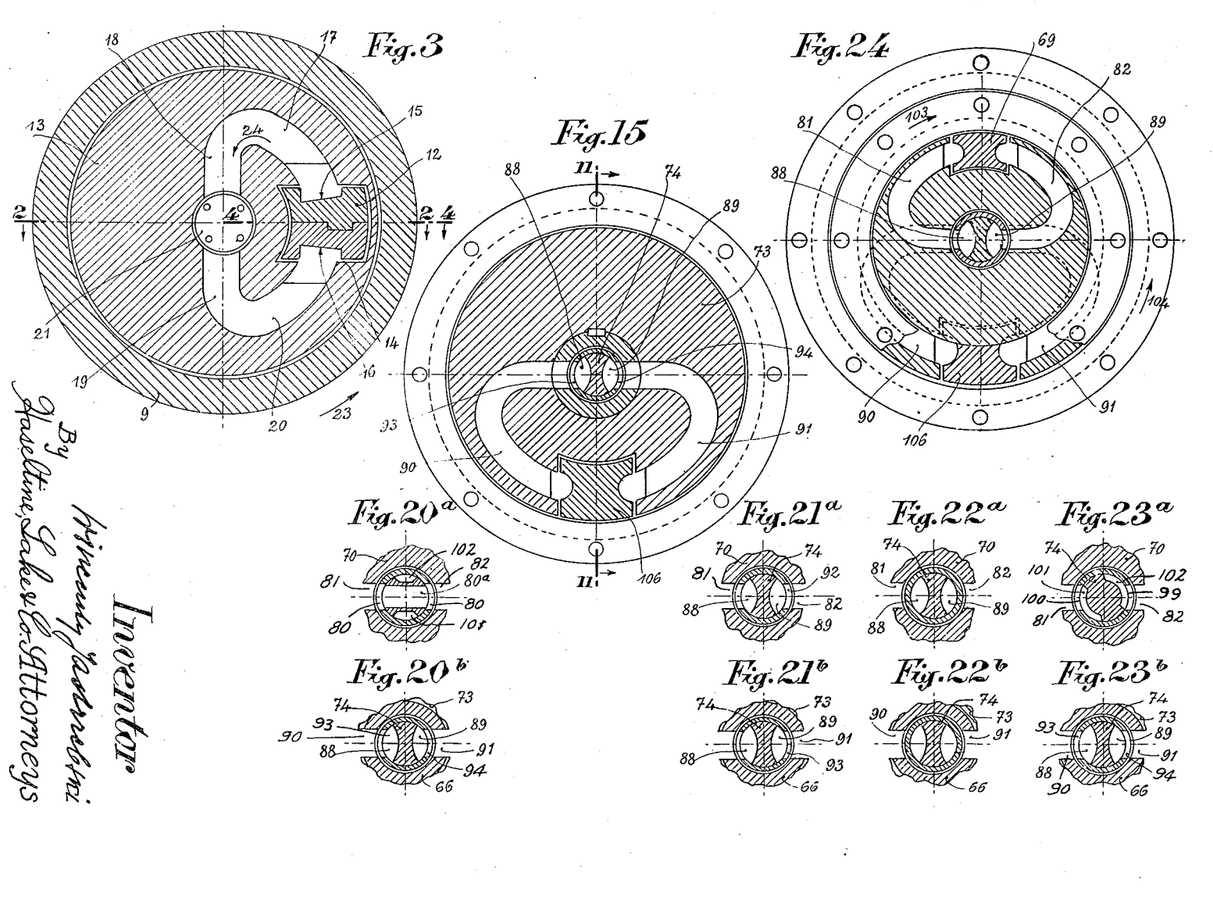
Figure 3 is a transverse sectional view on the line 3—3 of Fig. 2.
Figures 12, 13, 14 and 15 are respectively transverse sectional views along lines 12—12, 13—13, 14—14 and 15—15 of Fig. 11, showing the members included in the section planes, those situated rearwardly in other planes being omitted.
Figures 20a, 21a, 22a, 23a, 20b, 21b, 22b and 23b are transverse sectional views of the cylindrical valve taken respectively along the lines 20a—20a, 21a—21a, 22a—22a, 23a—23a, 20b—20b, 21b—21b, 22b—22b and 23b—23b of Fig. 11 in positions corresponding to the line 12—12 of Fig. 11 for the sections bearing the reference a and to the line 15—15 of Fig. 11 for the sections bearing the reference b, said positions being occupied after such displacements as are effected to provide idle run, first speed, second speed and reverse respectively.
Figure 24 is an explanatory view setting forth the operation of the power transmitter resulting from the superposition of the sectional views shown by Figs. 12 and 15.
Figure 4:
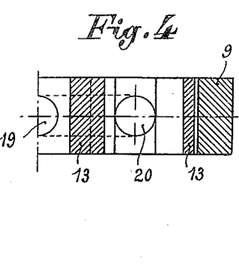
Figure 4 is a fragmentary sectional view on the line 4—4 of Fig. 3, assuming the set of movable partitions to be omitted.

In the constructional form shown in Figs. 1 to 3, the passage of the fluid from the disk channel 18 to the disk channel 19 is closed off by shifting the cock 21 in the direction shown by the arrow 26 (Fig. 2).

In order to permit the rotary motion of the driven shaft to be further transmitted, said shaft may be furnished with a pulley or any other suitable contrivance of conventional form (not shown).

Should the mouth 27 of the disk channel 19 be fully closed off, the driven shaft 5 will revolve as fast as the driving shaft 2. In such case, direct drive may be obtained by bringing claws 28 splined on the driven shaft 5 (Fig. 2) into meshing engagement with the spaces between claws formed integral with the plate 11 rigidly connected to the driving shaft 2.

Where, however, the mouth 27 of the disk channel 19 is only partly closed, the oil can flow therethrough slowly on account of the resulting overpressure against the face 16 of the partition 12, whereby the latter is moved and drives with it the shaft 5 but at a speed lower than that of the driving shaft 2.

The resultant rotary sliding action is the larger as the flow of oil is less slowed down. This enables an unlimited number of transmission ratios to be readily obtained in a most simple way.

In the modified constructional form shown in Figs. 7 to 10, the driving shaft 2 is secured to a pair of semi-circular shell members 31, 32 having facing surfaces so cut as to form walls between which is movably arranged a sector-shaped partition 33 to which an oscillatory motion is imparted with respect to the central port 34, valve 22 governing flow from one side of partition 33 to the other. The power transmitter assembly thus built up forms a change speed gear box whose operation is substantially the same as that of the first constructional form as above described.

Figure 7:
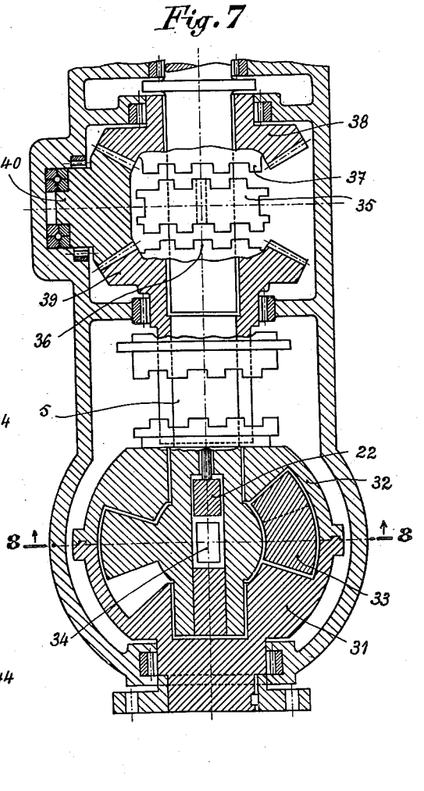
Figure 7 is a longitudinal sectional view on the line 7—7 of Fig. 8 showing a modified construction of the transmitter.
Figures 8, 14, 26, 27, 28:
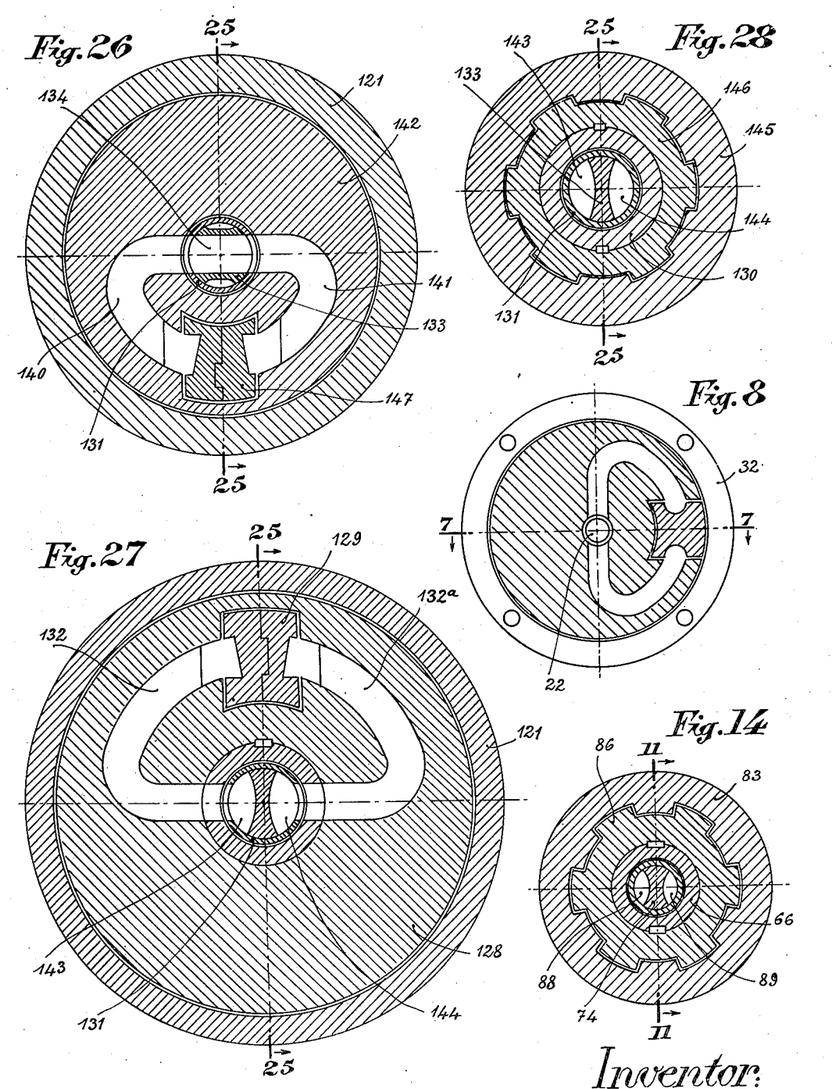
Figure 8 is a transverse sectional view on the line 8—8 of Fig. 7.
Figures 26, 27 and 28 are transverse sectional views respectively taken along lines 26—26, 27—27 and 28—28 of Fig. 25.

In Fig. 7 is shown, by way of example, a reversing gear mechanism comprising a slidable clutch collar 35 splined to a driven shaft and movable into mesh with the clutch 36 of the bevel pinion 39 or clutch 37 of the bevel gear 38, an intermediate idler bevel gear 40 being constantly in mesh with the bevel gears 38 and 39. The bevel gear 39 is carried by the shaft 5 as herein shown. When collar 35 meshes with clutch 36, a direct drive to shaft 5 is obtained, and when collar 35 is in mesh with clutch 37, drive shaft 5 will be driven in the opposite direction through gears 38, 40 and 39.

This power transmitter enables the ratio of the speeds of the two shafts which it intercouples to be changed. However, it does not fully transmit the input power.

In contradistinction to this, a change speed gear box embodying the power transmitter according to the invention and as shown in Figs. 11 to 24 possesses the speed changing characteristics as above described and is adapted, moreover, to fully transmit the input power when the speeds of the driving and driven shafts are in inverse ratio to the capacities of the two chambers connected to the respective shafts.

Figures 11, 12, 13, 16A, 16B, 16C:
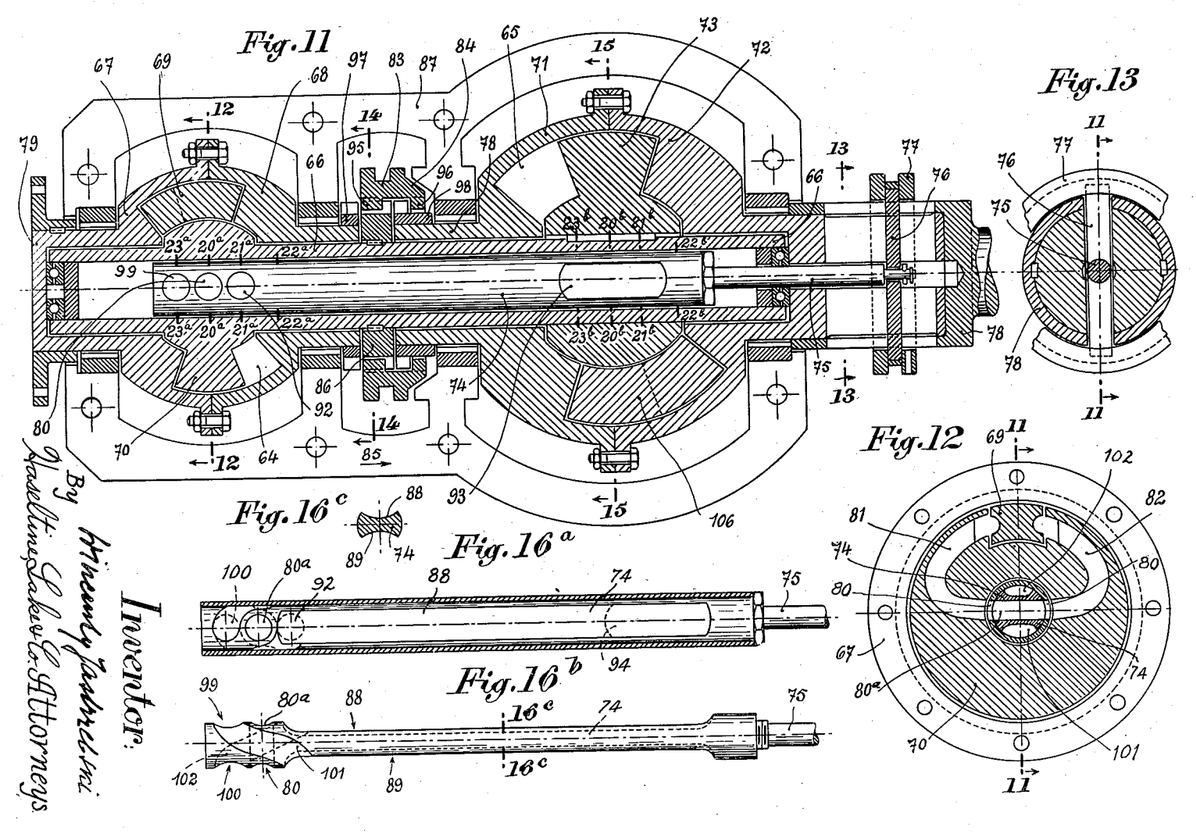
Figure 11 is a longitudinal sectional view on the line 11—11 of Figs. 12, 13, 14 and 15 of a power transmitter forming an entire gear box according to the invention.
Figures 16a, 16b and 16c are views of the cylindrical valve shown respectively in longitudinal elevation with a section through the casing, assuming the casing to be omitted and after a rotation of 90° about its axis and in section along the line 16c—16c of Fig. 16b.
Figure 17:
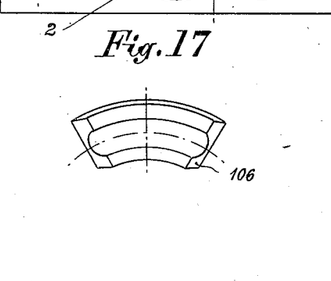
Figures 17, 18 and 19 are views of the movable partition which is visible in Fig. 15 shown respectively in elevational, end and top plan views.
Figure 18:
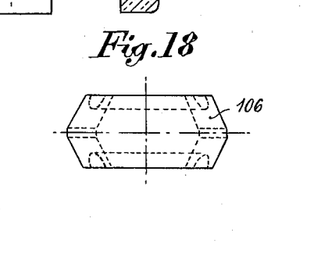
Figure 19:
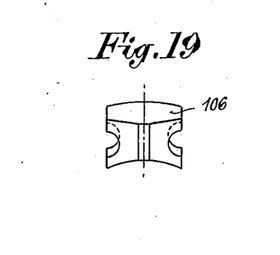

The power transmitter shown in Fig. 11 is made up of a pair of chambers 64, 65 having arcuate walls and different capacities, mounted for rotation on a tubular shaft 66 and having intercommunication as will be described hereafter.

The smaller chamber 64 is defined by a pair of shell members 67, 68 having walls so cut as to present undulated faces between which is arranged a sector-shaped partition 69 movable parallel to the axis of said chamber 64 and to which is imparted an oscillatory motion relative to the chamber center. Such partition 69 which ensures fluid tightness between the chamber walls is housed in a recess provided to that effect in a disk 70 rigidly carried by the tubular shaft 66 and revolubly housed in the chamber 64.

Inside the larger chamber 65 defined by the two shell members 71, 72 are accommodated a disk 73 and a partition 106 movably arranged between walls similar to those of the chamber 64.

Inside the tubular shaft 66 is housed for longitudinal motion a cylindrical valve 74 which enables the rate of flow of the liquid between the compartments of one and the same chamber or of a pair of different chambers as well as the direction of circulation of the liquid between the large chamber compartment to be adjusted.

In order to bring the cylindrical valve 74 to the different positions corresponding to idle run, low gear ratio, high gear ratio and reverse run, the displacement of said valve 74 is controlled by a rod 75 fixed by a key 76 to a ring 77 slidably mounted on the driven shaft 78.

Where the power transmitter is used as a change speed gear on a vehicle, the smaller chamber 64 of the transmitter unit is coupled at the left hand side end with the power or driving shaft 79 while its larger chamber is coupled at the right hand side end with the driven shaft 78.

Should the engine of the vehicle be started while the cylindrical valve 74 is in the position shown in Fig. 11, the vehicle cannot be set into motion because inside the chamber 64 which rotates together with the driving shaft 79 the liquid freely circulates from one face to the other face of the movable partition 69 through the channel 80 of the cylindrical valve 74 (Fig. 12) and through channels 81, 82 formed in the disk 70 which remains stationary.

Assuming now the toothed annular shell 83 of the bevel clutch 84 to be pushed in the direction shown by the arrow 85 through the toothed disk 86 (Fig. 11) keyed to the tubular shaft 66 and said shaft to be held motionless with respect to the frame 87 of the apparatus and assuming furthermore the cylindrical valve 74 to be moved in a direction opposite to that shown by the arrow 85 so as progressively to close off direct flow of the liquid through the smaller chamber 64, the liquid circulation will be set up from the smaller chamber 64 toward the larger chamber 65 through the side channels 88, 89 (Fig. 15) in the valve 74. The path followed by the liquid will be therefore as follows: channel 81 in disk 70 (Fig. 24), side channel 88 in valve 74, channel 90 in disk 73 (Fig. 15), chamber 65, channel 91 in disk 73, channel 89 in valve 74, and channel 82 in disk 70.

Owing to the reactive stress exerted by the liquid against the walls of the chamber 65 whose casing is mounted upon the driven shaft 78, the vehicle will be started and will take up a speed which will increase at the same time as the rate of flow between the chambers 64 and 65, i. e. at the same time as the relative speeds between larger chamber 65 and smaller chamber 64.

Should the cylindrical valve 74 be so moved as to cause the ports 92 (Fig. 11) to replace the ports 90 and to establish communication with the channels 81, 82 in the disk 78, direct communication of the liquid through the smaller chamber 64 will be cut off. The full quantity of liquid will flow through the larger chamber 65 owing to the provision of the side channels 88, 89 and will impart thereto a motion whose speed will be in inverse ratio to the relative capacities of both chambers 64, 65.

It will be noticed that owing to the larger radius and the larger pressure surface in the larger chamber 65, the energy is transmitted without any substantial loss.

In order to further increase the speed of the chamber 65, the driven shaft 78 may be freed by shifting the clutch 83 in a direction reverse of that of the arrow 85 and the cylindrical valve 74 may be further moved in the same direction. When the ports 92 no longer register with 81 and 82 and side ports 93, 94 are no longer opposite the respective ports of the channels 90, 91 (Figs. 15 and 22) in the disk 73, the liquid flow is cut off intermediate the chambers 64, 65.

After the liquid flow has thus been cut off, both chambers 64, 65 and the tubular shaft 66 revolve at the same speed. By moving the clutch 83 in a direction reverse to that shown by the arrow 85, a direct drive is secured since owing to the intermeshing of the clutch parts 95, 96 with the clutch parts 97, 98 respectively connected to the driving shaft 79 and the driven shaft 78 are coupled up. At that moment, the liquid pressure inside the chambers is equal to zero.

In order to obtain a reverse drive, the cylindrical valve 74 must be moved in the direction shown by the arrow 85 until the ports 99, 100 assume the position opposite channels 81 and 82, respectively. The clutch 83 should be moved in the same direction to connect up the tubular shaft 66 to the frame 67.

When the ports 99 and 100 coincide with the channels 81 and 82 in the disk 78, the liquid flows through the slanting channel 101 toward the side channel 89 formed in the opposite face of the cylindrical valve 74. Conversely the channel 101 is set into communication with the other side channel 88 through the other slanting channel 102. The direction of the liquid flow through the chamber 65 is therefore reverse to its previous direction of flow. This change of flow direction involves a change in the direction of revolution of the chamber 65 with respect to its previous direction of revolution. The reverse drive of the vehicle fitted with such a power transmitter is thus obtained.

Assuming the cylindrical valve 74 to occupy the position shown in Fig. 11 (idle run position) and said valve to be brought to the position corresponding for example to the lower gear ratio and assuming, moreover, the driving shaft 79 to revolve in the direction shown by the arrow 103 (Fig. 24) the smaller chamber 64 will rotate in the same direction. As pressure prevails in the channels 81, 88, 90, the larger chamber is driven in the same direction.

Should now the cylindrical valve 74 be so moved as to bring the ports 99, 100 to the locations occupied by those of the channel 80, the pressure will prevail in the channels 81, 89, 91 and the larger chamber will revolve in the direction indicated by the arrow 104.

It will be seen that the twin chamber change gear power transmitter as above described enables an unlimited number of gearing ratios to be obtained during which the powers of the driving and driven shafts are proportional to the speeds of said shafts. Moreover, said transmitter permits two gearing ratios, i. e. two rates of speed to be secured, namely a direct drive, and a drive which is inversely proportional to the capacity of the two chambers.

The constructional modification shown in Figs. 25 to 37a is based on the same operational principle and is adapted to fully transmit the power received for three set rates of speed and to obtain an unlimited number of gearing ratios but with a decrease in the power.

In this constructional modification of the power transmitter there are provided a smaller chamber 120 (Fig. 25) and a larger double chamber 121. The capacity of said larger chamber is split into a pair of compartments by a partition 122 held stationary by securing means such as dowel pins 123.

Figure 29:
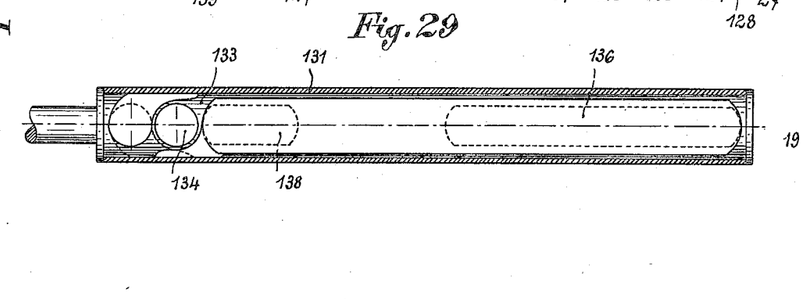
Figure 29 is a separate view of the cylindrical valve, its casing being shown in section.
Figure 33A:
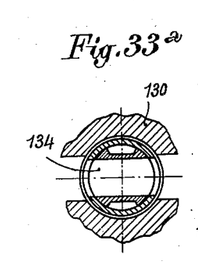
Figures 33a, 34a, 35a, 36a, 37a, 33b, 34b, 35b, 36b, and 37b are transverse sectional views of the cylindrical valve taken respectively along the lines 33a—33a, 34a—34a, 35a—35a, 36a—36a, 37a—37a, 33b—33b, 34b—34b, 35b—35b, 36b—36b and 37b—37b of Fig. 25 in the positions corresponding to 26—26 of said figure for sections referenced by a and to 27—27 of the same figure for sections referenced by b, such positions being those assumed after the displacements effected to obtain the idle run, the first speed, the second speed, the third speed and the reverse respectively.
Figure 33B:
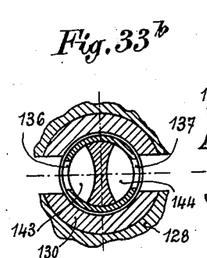
Figures 34A, 34B:
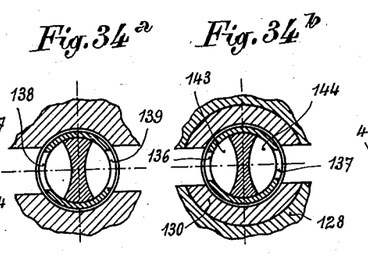
Figure 35A:
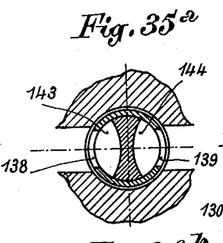
Figure 35B:
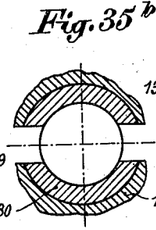
Figure 36A:
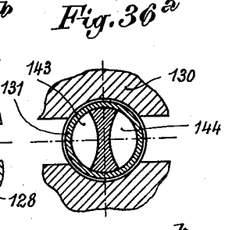
Figures 36B, 37A, 37B:
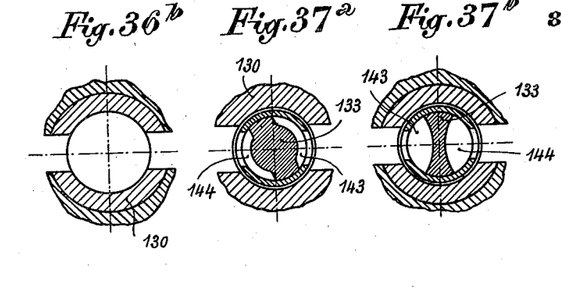

In the compartment 124 are revolubly arranged a disk 125 and its movable partition 126 while in the other compartment 127 are revolubly arranged a disk 128 and its movable partition 129. These two disks are rigidly connected to a tubular shaft 130 in which is movably housed a cylindrical valve 131. As shown in Fig. 29, said valve comprises a sleeve 131 surrounding a core 133 having a port 134 for idle running conditions and more or less elongated grooves providing direct or reverse communication between the compartment 135 in the smaller chamber 120 and the compartments 124, 127 in the larger chamber 121. The channels 136, 137 facing the larger chamber have a particularly elongated shape as well as those 138, 139 in front of which are the ends of the channels 140, 141 in the disk 142 which drives the movable partition 147.

The channels 143, 144 establish communication between the compartments defined in the smaller and larger chambers as shown in each particular instance by the detailed figures 33a, 33b to 37a and 37b.

A power transmitter thus constructed is also provided with a conical member 145 whose axial displacement provides or fails to provide a connection between the chambers 120, 121 and the toothed clutch 146 secured to the shaft 130.

When shifting the cylindrical valve 131 to match requirements, a flow of liquid is established between the smaller chamber 120 and the two compartments 124, 127 of the larger chamber 121 or else such flow is reduced to the flow between the smaller chamber 120 and one compartment of the larger chamber 121. The partitioning of the larger chamber into a pair of compartments permits three gear ratios to be obtained and a full transmission of the input power to be secured. Such gear ratios are as follows: Firstly, a direct drive. Secondly, a gear ratio which is in inverse terms of the capacity of the chambers 120, 121. Thirdly, a gear ratio which is in inverse terms of the capacity of the smaller chamber 120 with respect to that of one of the compartments in the larger chamber 121.

The operation of this power transmitter is substantially the same as the one of the transmitter shown in Figs. 11 to 24 with the exception that during operation with the upper gear ratio the extreme compartment 127 of the larger chamber 121 does not operate.

Figure 25:
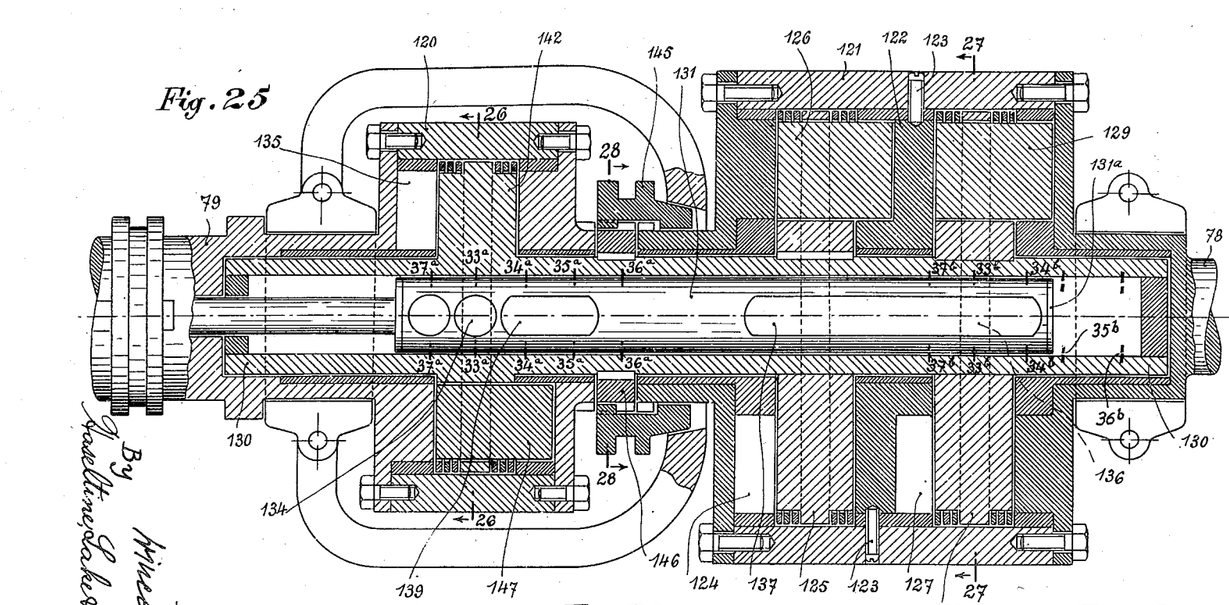
Figure 25 is a longitudinal sectional view of a further constructional modification of a power transmitter according to the invention.

It will be understood that in order to obtain the upper gear ratio, the cylindrical valve 131 must be so shifted as to bring the line 35a—35a of Fig. 25 to the location of the line 33a—33a.

The end 131a of said valve then entirely projects from the port of the channels 132, 132a (Fig. 27) in the outermost disk 128 of the larger chamber 121 and does away with any communication between the smaller chamber 120 and the compartment 127 in said larger chamber.

Such a motion imparted to the cylindrical valve 131 provides a direct communication between both faces of the movable partition 129 defining the compartment 127 so that the liquid therein flows without producing any effect as in the smaller chamber 120 during idle run.

Therefore the capacity of the larger chamber 121 is reduced as it were by comparison with the capacity of the smaller chamber 120. The speed of the driven shaft is consequently enhanced.

It will be seen that a power transmitter as above described enables the several objects of the invention to be fulfilled and particularly the following results to be obtained, namely:

(a) an unlimited number of transmission ratios between a driving shaft and a driven shaft;

(b) three different rates of speed or transmission ratios without any reduction of power;

(c) a selective reverse in the direction of rotation.

Minor constructional details might be changed without departing from the scope of the subjoined claims.

What is claimed is:

1. A power transmitter comprising in combination with a driving shaft and a driven shaft a casing rigid with the driving shaft and defining a fluid-containing chamber having a circular peripheral surface and sinusoidally curved parallel end surfaces, a channelled circular divider rigid with the driven shaft and so revolubly fitted in said chamber as to split it diametrically into a pair of communicating compartments, a ported partition slidably carried by said divider and tightly contacting the chamber end surfaces to divide each compartment into a pair of communicating sub-compartments, primary valve means controlling the communication between the compartments through the divider channels, and secondary valve means controlling the communication between the pairs of sub-compartments on opposite sides of the partition through a port in the same.

2. A power transmitter comprising in combination with a driving shaft and a driven shaft a casing rigid with the driving shaft and defining a fluid-containing chamber having a circular peripheral surface and sinusoidally curved parallel end surfaces, a channelled circular disk rigid with the driven shaft and so revolubly fitted in said chamber as so split it diametrically into a pair of communicating compartments mutually communicating through the channels of the disk and having a constant total volume a partition slidably carried at right angles through said disk and tightly contacting the chamber end surfaces to divide each compartment into a pair of sub-compartments, each face of the partition having longitudinal ports interconnecting the subcompartments on opposite sides of the disk, the partition also having a transverse port interconnecting its longitudinal ports, primary valve means controlling the sectional area of the disk channels, and secondary valve means controlling the sectional area of the transverse port in the partition.

3. A power transmitter as recited in claim 1 wherein said partition is formed of a plurality of interfitting members slidable relatively to each other through said divider.

4. A power transmitter as recited in claim 1 wherein said partition is formed of a plurality of members slidable across said divider and slidably connected to each other by interfitting tongues and grooves for movement relatively to each other.

5. A power transmitter as recited in claim 1 wherein said partition is formed of a pair of interfitting members slidable relatively to each other through a radial notch in said divider.

6. A power transmitter as recited in claim 1 wherein said partition is formed of a pair of juxtaposed members slidable across said divider, and formed with interfitting tongue and groove connections on their adjacent side faces and with ports on their outer side faces.

7. A power transmitter according to claim 1 wherein said partition is formed with ports in its side faces and said divider is formed with curved channels respectively connecting said ports with said primary valve means.

8. A power transmitter according to claim 1 wherein said partition is formed with ports in its side faces and said divider is formed with curved channels respectively connecting said ports with said primary valve means, and said ports are connected to each other by a crossport extending laterally across the partition, the effective area of said crossport being controlled by said secondary valve means.

WINCENTY JASTRZEBSKI.